United States Patent
Saito et al.

(10) Patent No.: US 8,643,247 B2
(45) Date of Patent: Feb. 4, 2014

(54) ELECTRIC MOTOR AND REDUCTION MOTOR

(71) Applicants: Tatsuyuki Saito, Kiryu (JP); Ryuichi Takakusagi, Kiryu (JP); Toshiyuki Kimura, Kiryu (JP); Yoshichika Kawashima, Kiryu (JP); Kenji Sakata, Kiryu (JP)

(72) Inventors: Tatsuyuki Saito, Kiryu (JP); Ryuichi Takakusagi, Kiryu (JP); Toshiyuki Kimura, Kiryu (JP); Yoshichika Kawashima, Kiryu (JP); Kenji Sakata, Kiryu (JP)

(73) Assignee: Mitsuba Corporation, Gunma-ken (JP)

( * ) Notice: Subject to any disclaimer, the term of this patent is extended or adjusted under 35 U.S.C. 154(b) by 0 days.

(21) Appl. No.: 13/859,470

(22) Filed: Apr. 9, 2013

(65) Prior Publication Data
US 2013/0293054 A1 Nov. 7, 2013

Related U.S. Application Data

(63) Continuation of application No. 12/998,316, filed as application No. PCT/JP2009/005229 on Oct. 7, 2009, now Pat. No. 8,436,505.

(30) Foreign Application Priority Data

Oct. 7, 2008 (JP) ................................. 2008-260987

(51) Int. Cl.
*H02K 13/00* (2006.01)
(52) U.S. Cl.
USPC ............................ 310/238; 310/245; 310/233
(58) Field of Classification Search
USPC .......... 310/230, 231, 232, 233, 234, 238, 245
See application file for complete search history.

(56) References Cited

U.S. PATENT DOCUMENTS

| 4,754,184 | A | | 6/1988 | Morikane et al. |
| 5,023,532 | A | | 6/1991 | Gakenholz |
| 5,047,679 | A | | 9/1991 | Baader et al. |
| 5,306,974 | A | * | 4/1994 | Bates .......................... 310/68 R |

(Continued)

FOREIGN PATENT DOCUMENTS

| CN | 1417928 | 5/2003 |
| CN | 1512647 | 7/2004 |

(Continued)

OTHER PUBLICATIONS

Chinese Office Action mailing date of Oct. 19, 2012 on the underlying Application No. 200980139974.5 with English translation thereof.

(Continued)

*Primary Examiner* — Nguyen N Hanh
(74) *Attorney, Agent, or Firm* — Kenyon & Kenyon LLP

(57) ABSTRACT

Disclosed is an electric motor including a yoke formed in a bottomed cylindrical shape; permanent magnets arranged on an inner peripheral surface of the yoke; an armature including a rotary shaft journalled on the yoke, an armature core formed with a plurality of teeth and fixed onto the rotary shaft, an armature coil wound around the teeth of the armature core, a commutator having a plurality of segments and being fixed onto the rotary shaft, and a connecting wire connecting two segments arranged to face each other back to back around the rotary shaft, the armature being surrounded by the permanent magnets and accommodated within the yoke; and a first brush, a second brush, and a third brush coming into sliding contact with the segments of the commutator of the armature.

6 Claims, 5 Drawing Sheets

(56) References Cited

U.S. PATENT DOCUMENTS

| | | | |
|---|---|---|---|
| 5,485,049 A | 1/1996 | Shannon et al. | |
| 5,949,173 A * | 9/1999 | Wille et al. | 310/220 |
| 6,452,297 B2 | 9/2002 | Yamamoto et al. | |
| 6,555,943 B2 * | 4/2003 | Walther et al. | 310/239 |
| 6,617,744 B2 | 9/2003 | Kershaw et al. | |
| 6,694,599 B1 | 2/2004 | Kershaw et al. | |
| 7,071,643 B2 * | 7/2006 | Prevo et al. | 318/268 |
| 7,291,957 B2 | 11/2007 | Simofi-Ilyes et al. | |
| 8,436,505 B2 * | 5/2013 | Saito et al. | 310/238 |
| 2004/0145268 A1 * | 7/2004 | Yamamoto et al. | 310/249 |
| 2005/0225198 A1 | 10/2005 | Simofi-Ilyers et al. | |
| 2007/0216255 A1 * | 9/2007 | Weigold et al. | 310/234 |
| 2008/0231137 A1 | 9/2008 | Sugishima et al. | |
| 2010/0052440 A1 | 3/2010 | Shioda et al. | |
| 2011/0018380 A1 | 1/2011 | Yoshida et al. | |

FOREIGN PATENT DOCUMENTS

| | | |
|---|---|---|
| JP | YS45004747 | 3/1970 |
| JP | AS61112556 | 5/1986 |
| JP | AH02184246 | 7/1990 |
| JP | AH03011963 | 1/1991 |
| JP | AH03500960 | 2/1991 |
| JP | UH05018272 | 3/1993 |
| JP | UH07028756 | 5/1995 |
| JP | AH09023627 | 1/1997 |
| JP | AH10503640 | 3/1998 |
| JP | 2000-060049 | 2/2000 |
| JP | 2000-166185 | 6/2000 |
| JP | 2001-069723 | 3/2001 |
| JP | 2001-095219 | 4/2001 |
| JP | 2001-112217 | 4/2001 |
| JP | 2001-231219 | 8/2001 |
| JP | 2001-268856 | 9/2001 |
| JP | 2001-320862 | 11/2001 |
| JP | 2002-017061 | 1/2002 |
| JP | 2002-058227 | 2/2002 |
| JP | 2002-218692 | 8/2002 |
| JP | 2002-233123 | 8/2002 |
| JP | 2002-291210 | 10/2002 |
| JP | 2002-305861 | 10/2002 |
| JP | 2002-315274 | 10/2002 |
| JP | 2002-320361 | 10/2002 |
| JP | 2002-325390 | 11/2002 |
| JP | 2003-047223 | 2/2003 |
| JP | 2003-134772 | 5/2003 |
| JP | 2003-153488 | 5/2003 |
| JP | 2004-056851 | 2/2004 |
| JP | 2004-248460 | 9/2004 |
| JP | 2004-274816 | 9/2004 |
| JP | 2004-274821 | 9/2004 |
| JP | 2004-289992 | 10/2004 |
| JP | 2005-012945 | 1/2005 |
| JP | 2005-0176825 | 7/2005 |
| JP | 2006-033947 | 2/2006 |
| JP | 2006-352993 | 12/2006 |
| JP | 2006-353019 | 12/2006 |
| JP | 2007-143208 | 6/2007 |
| JP | 2007-143278 | 6/2007 |
| JP | 2007-202391 | 8/2007 |
| JP | 2008-079451 | 4/2008 |
| JP | 2008-092731 | 4/2008 |
| JP | 2008-131800 | 6/2008 |
| JP | 2008-253086 | 10/2008 |
| JP | 2008-253137 | 10/2008 |
| JP | 2009-017719 | 1/2009 |
| JP | 2010-011697 | 1/2010 |
| JP | 2010-017078 | 1/2010 |
| JP | 2010-022198 | 1/2010 |
| JP | 2010-022199 | 1/2010 |
| JP | 2010-022200 | 1/2010 |
| JP | 2010-022201 | 1/2010 |
| JP | 2010-035403 | 2/2010 |
| JP | 2010-035405 | 2/2010 |
| JP | 2012-187000 | 9/2012 |
| JP | 2012-200145 | 10/2012 |
| JP | 2012-200146 | 10/2012 |
| RU | 2011-114810 | 10/2012 |
| WO | 2005-076442 | 8/2005 |
| WO | 2009-119456 | 10/2009 |
| WO | 2010-001899 | 1/2010 |
| WO | 2010-041448 | 4/2010 |

OTHER PUBLICATIONS

International Search Report issued on the underlying PCT/JP2009/005229 with English translation thereof.

Russian Office Action mailing date of May 31, 2013 on the underlying application RU 2011114810 with English translation thereof.

Notice of Allowance mailed Sep. 3, 2013 in U.S. Appl. No. 13/859,458.

* cited by examiner

ELECTRIC MOTOR AND REDUCTION MOTOR

This application is a continuation application based on a U.S. patent application Ser. No. 12/998,316, whose priority is claimed on Japanese Patent Application No. 2008-260987 filed on October 7 and incorporating the contents of this Japanese Patent Application by reference.

TECHNICAL FIELD

The present invention relates to an electric motor mounted on, for example, a vehicle, and particularly, to a reduction motor.

BACKGROUND ART

In the related art, electric motors with brushes have been used as wiper motors for an automobile. In this type of electric motor, a plurality of permanent magnets are arranged at equal intervals in the circumferential direction on the inner peripheral surface of a cylindrical yoke, and an armature is surrounded by these permanent magnets and rotatably supported by the yoke. The armature has an armature core, and a plurality of teeth is formed in a radial fashion on the armature core. Slots are spaces that are formed between the respective teeth. Electric coils are wound so as to surround the plurality of teeth through two slots. The armature has a rotary shaft, and a commutator is fixed to the rotary shaft.

The commutator includes an insulating body formed in a columnar shape, and segments including a plurality of metal pieces. The plurality of segments are insulated from each other and disposed side by side along the circumferential direction on the insulating body. A winding starting end and a winding finishing end of an electric coil are connected to each of these segments. A brush comes into sliding contact with each segment, and an electric current is supplied to each electric coil via the segment from this brush. A magnetic field passing through the armature core is generated by the electric current supplied to the electric coil, and the armature is rotated together with the rotary shaft by a magnetic attractive force or repulsive force that is generated between the permanent magnets fixed to the yoke and the armature core.

In recent years, demands for miniaturization and high performance of the wiper motors are increasing. As a result, there is known a wiper motor that includes magnets of which the number of magnetic poles is four (the number of pole pairs is two), an armature with more teeth, and four brushes and that enables changes in rotational speed (for example, refer to Patent Document 1). In the motor disclosed in this Patent Document 1, patterns of energization to the four brushes are changed, and each mode of a low-speed rotation mode, a medium-speed rotation mode, and a high-speed rotation mode is selected. This motor includes the armature with four magnetic poles and a number of teeth, and the rotating speed of the armature is variable.

PRIOR ART DOCUMENT

Patent Document

[Patent Document 1] Japanese Unexamined Patent Application, First Publication No. 2006-353019

DISCLOSURE OF THE INVENTION

Problem that the Invention is to Solve

Incidentally, in the above-described motor, gaps are respectively present between the four permanent magnets disposed on an inner peripheral surface of the yoke. Thus, changes in magnetic flux between the permanent magnet side and the gaps increase with both ends of each permanent magnet as boundaries. For this reason, when respective teeth of the armature passes by both the ends of each permanent magnet, a magnetic attractive force or repulsive force that acts between the teeth and the magnet change greatly, and thereby cogging torque is generated. As a result, the vibration and noise of the electric motor increase.

The invention has been made in view of the above-described circumstances, and provides an electric motor and a reduction motor that can reduce vibration and noise while achieving miniaturization and high performance, and that can also change the rotational speed of the motor.

Means for Solving the Problems

A first invention related to the invention is an electric motor including: a yoke formed in a bottomed cylindrical shape; permanent magnets being arranged on an inner peripheral surface of the yoke and generating four magnetic poles formed of alternately arranged magnetic poles; an armature including a rotary shaft journalled on the yoke, an armature core formed with a plurality of teeth and fixed onto the rotary shaft, an armature coil wound around the teeth of the armature core, a commutator having a plurality of segments formed from a conductive material and fixed onto the rotary shaft, and a connecting wire connecting two segments arranged to face each other back to back around the rotary shaft among a plurality of segments of the commutator, the armature being surrounded by the permanent magnets and accommodated within the yoke; and a first brush, a second brush, and a third brush coming into sliding contact with the segments of the commutator of the armature. In this electric motor, the number of the teeth of the armature core and the number of the segments of the commutator are the same number, and are any of fourteen, eighteen, and twenty two, the teeth of the armature core are formed point-symmetrically, the first brush and the second brush are arranged apart by an angle of substantially 90 degrees from each other, the third brush is arranged apart by an angle exceeding 90 degrees from the first brush and second brush, the first brush is connected to a common potential, an electric current for rotating the armature at low speed is selectively supplied to the second brush, an electric current for rotating the armature at high speed is selectively supplied to the third brush, a width of the third brush is made smaller than a width of the second brush, and the third brush is arranged at a position where the third brush does not come into sliding contact with an equipotential segment connected by the connecting wire to a segment of the commutator coming into sliding contact with the second brush.

According to a second invention related to the invention, in the electric motor of the first invention, the electric resistance value of the third brush is a value of two times or more the electric resistance value of the second brush.

According to a third invention related to the invention, in the electric motor of the first or second invention, the width of the first brush and the width of the second brush are made substantially the same, and the electric resistance value of the first brush and the electric resistance value of the second brush are substantially the same.

According to a fourth invention related to the invention, in the electric motor of any one of the first to third inventions, the widths of the first brush and the second brush in the circumferential direction are set within a range of 2.5 mm or more and 5 mm or less, and the circumferential width of the third brush is set to a range that is equal to and more than 1.5 mm and smaller than 2.5 mm.

According to a fifth invention related to the invention, in the electric motor of any one of the first to fourth inventions, the third brush is arranged apart from the first brush by an angle θ that exceeds 90 degrees where the third brush does not come into sliding contact with an equipotential segment connected by the connecting wire to a segment of the commutator coming into sliding contact with the second brush.

According to a sixth invention related to the invention, in the electric motor of any one of the first to fifth inventions, the armature coil of the armature includes a plurality of first winding wires formed by a first conductive wire, and a plurality of second winding wires formed by a second conductive wire, the first winding wires and the second winding wires are arranged point-symmetrically, the connecting wire includes a plurality of first connecting wire portions formed by the first conductive wire and a plurality of second connecting wire portions formed by the second conductive wire, the plurality of first connecting wire portions connect the plurality of first winding wires in series, and the plurality of second connecting wire portions connect the plurality of second winding wires in series.

Advantageous Effects of Invention

In the invention, since the plurality of teeth of the armature core are formed on the core body at equal intervals along the circumferential direction, the respective teeth and the respective slots are present point-symmetrically around the rotary shaft. On the other hand, a slot is present at a position apart by an angle of 90 degrees from a tooth in the circumferential direction of the armature core. As a matter of course, a tooth is present at a position apart by an angle of 90 degrees from a slot in the circumferential direction of the armature core. For this reason, when a tooth passes through one end of each permanent magnet, a slot passes through the other end. Therefore, changes in a magnetic attractive force or repulsive force that acts between the teeth and the magnet do not occur simultaneously at both ends of each permanent magnet, and the changes in the magnetic attractive force or repulsive force occur so as to shift from each other by ½ pitch of the pitch between two slots of the armature. Accordingly, the cogging torque decreases on average. As a result, the vibration and noise of the electric motor decrease.

That is, the vibration and noise are reduced by selecting any of 7 times, 9 times, and 11 times the number of pole pairs (two) as the number of teeth and slots. For this reason, a high-performance electric motor and a reduction motor can be provided.

The circumferential width of the high-speed brush is set to be smaller than the circumferential width of the low-speed brush, and a situation where the high-speed brush simultaneously comes into sliding contact with a segment having the same potential as a segment that comes into sliding contact with the low-speed brush is avoided.

Here, in a case where the electric motor is rotatably driven at low speed, as the high-speed brush that is not used comes into sliding contact with two segments, a coil connected to the two segments is short-circuited, the number of effective coils decreases, and variation occurs in electric currents that flow through respective coils. As a result, the vibration and noise of the electric motor may increase.

However, influence of the high-speed brush during low rotational driving can be made small by setting the circumferential width of the high-speed brush to be smaller than the circumferential width of the low-speed brush. For this reason, an electric motor and a reduction motor with less vibration and noise can be provided.

MODES FOR CARRYING OUT THE INVENTION

Next, an embodiment of the invention will be described with reference to the drawings.

Figure 1:
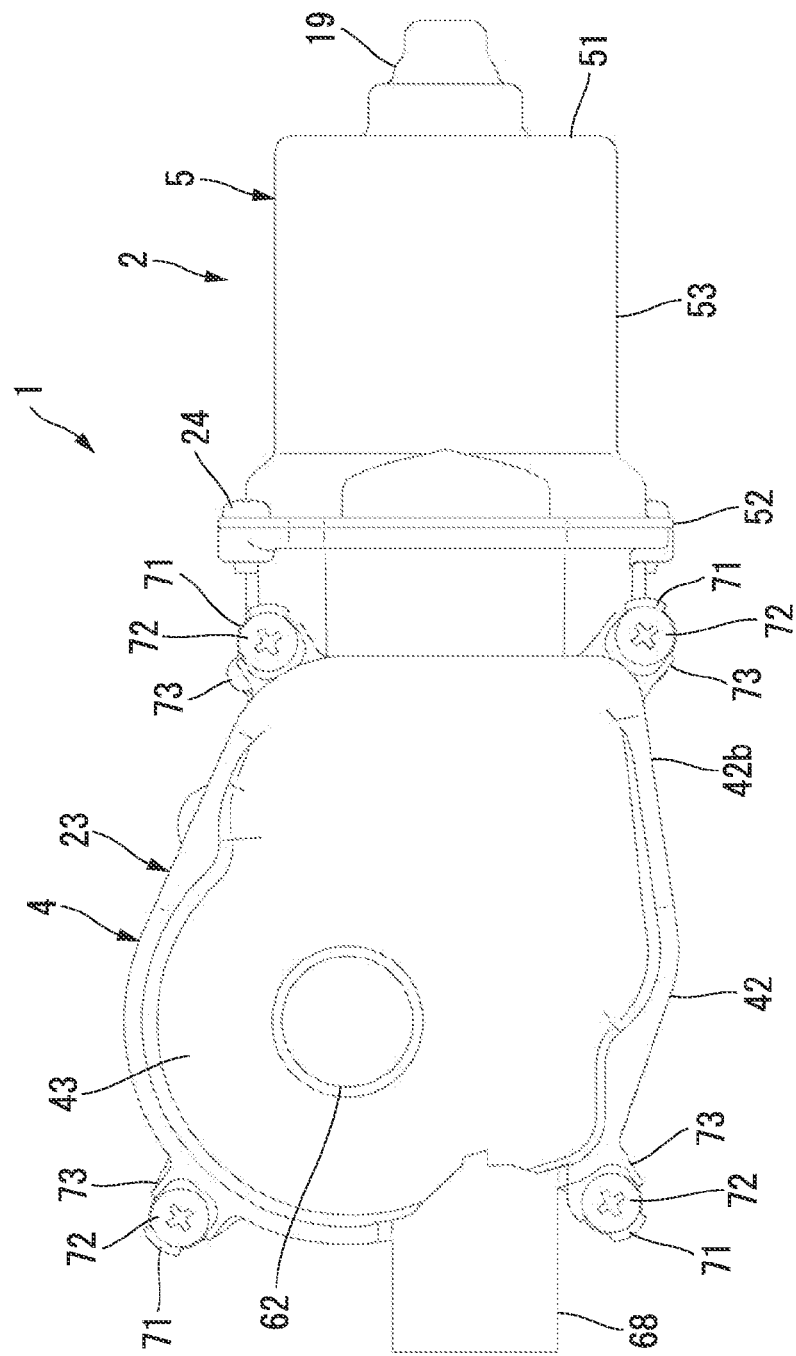
FIG. 1 is a plan view of a reduction motor according to an embodiment of the invention.
Figure 2:
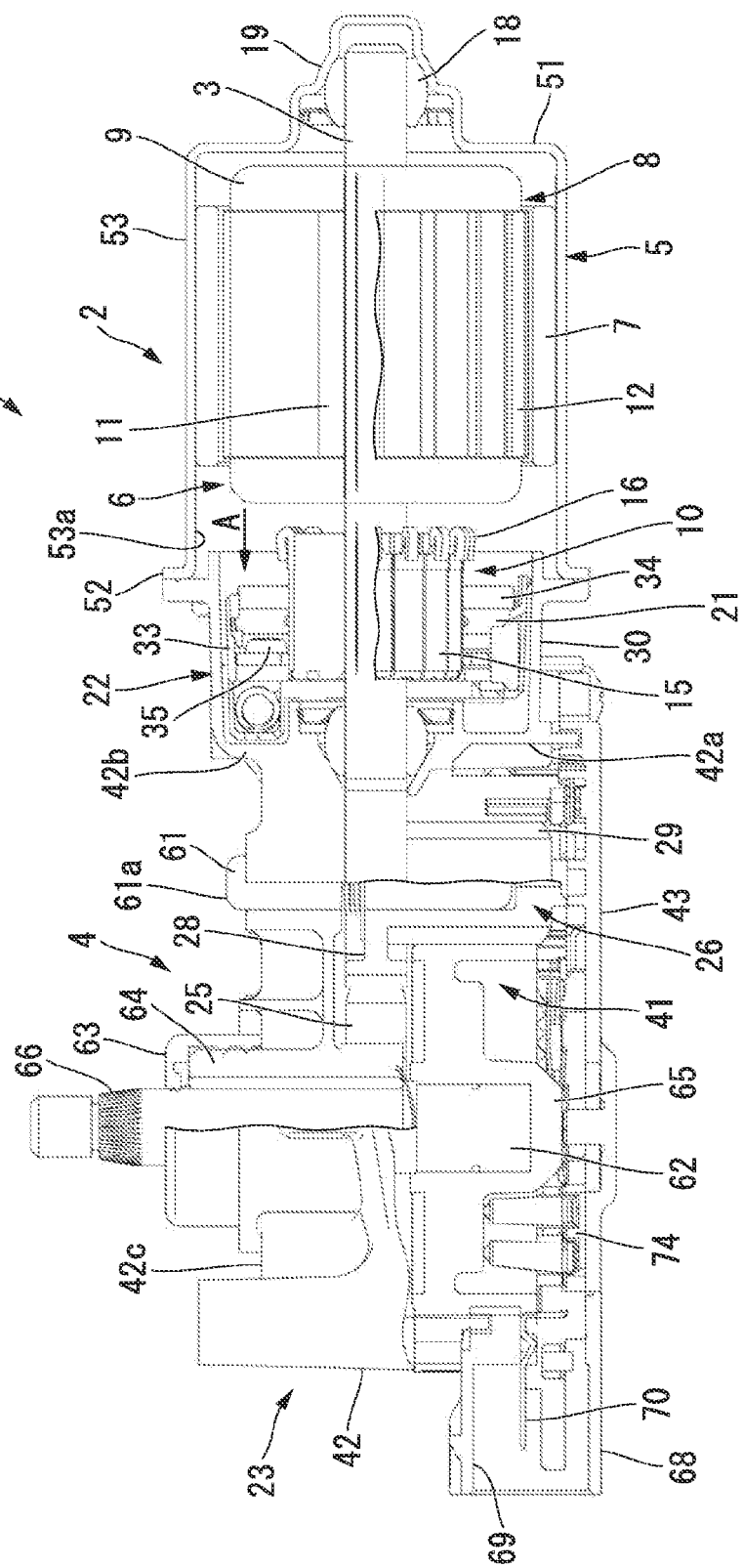
FIG. 2 is a longitudinal cross-sectional view of the reduction motor according to the embodiment of the invention.
Figure 3:
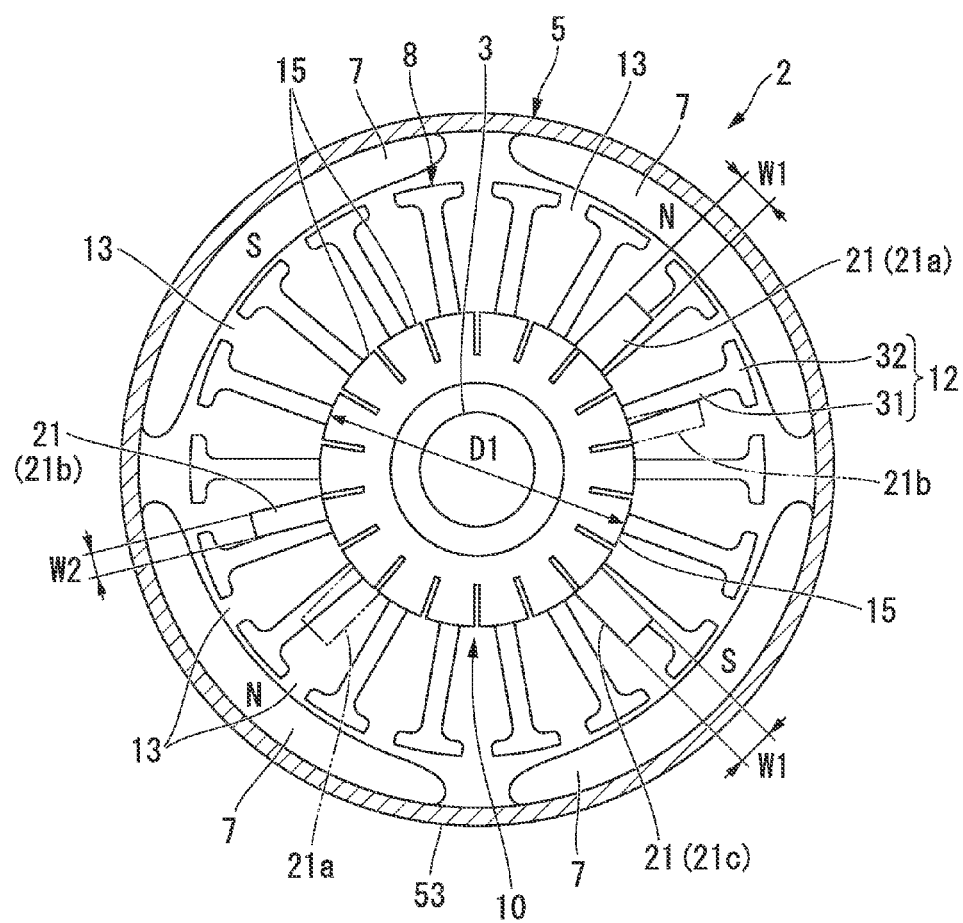
FIG. 3 is a cross-sectional view of an electric motor according to the embodiment of the invention.
Figure 4:
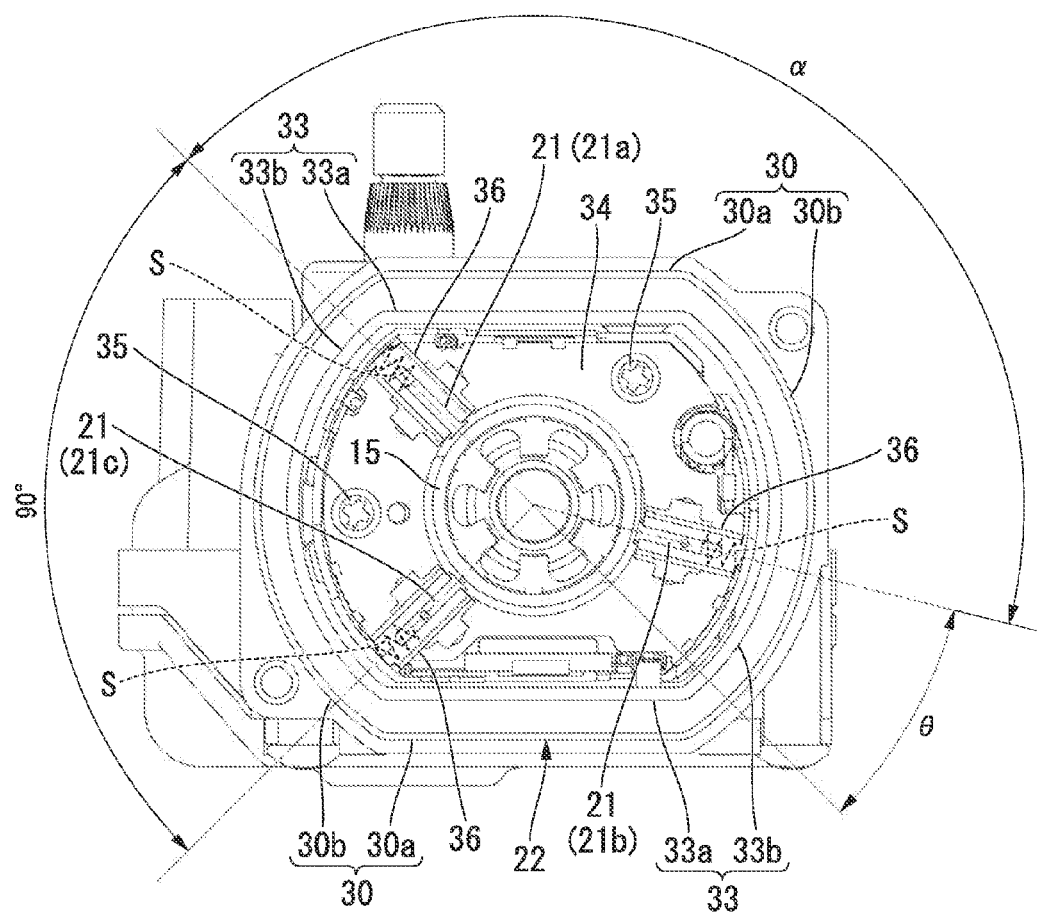
FIG. 4 is a view as seen from arrow A of FIG. 2.

As shown in FIGS. 1 to 3, a reduction motor 1 is used as, for example, a wiper motor of an automobile, and includes an electric motor 2, and a reduction mechanism 4 connected to a rotary shaft 3 of the electric motor 2.

The electric motor 2 has a bottomed cylindrical yoke 5, and an armature 6 rotatably provided within the yoke 5.

A tubular portion 53 of the yoke 5 is formed in a substantially cylindrical shape, and four segment type permanent magnets 7 are disposed at equal intervals in a circumferential direction on the inner peripheral surface of the tubular portion 53 such that magnetic poles are alternate. That is, the permanent magnets 7 provided at the yoke 5 generate a magnetic field with two pole pairs.

The center of a bottom wall (an end portion) 51 of the yoke 5 is formed with a boss portion 19 that protrudes outward, and a bearing 18 for journalling one end of the rotary shaft 3 is fixed to the boss portion 19.

An opening 53a of the tubular portion 53 is provided with an outer flange portion 52. The outer flange portion 52 is formed with a bolt-hole (not shown). A bolt 24 is inserted through this bolt-hole, and the yoke 5 is fixed to the reduction mechanism 4 as the bolt 24 is screwed into a bolt-hole (not shown) formed in a gear housing 23 of the reduction mechanism 4.

The armature 6 includes the rotary shaft 3, an armature core 8 fixed to the rotary shaft 3, an armature coil 9 wound around the armature core 8, and a commutator 10 fixed onto the rotary shaft 3. The armature core 8 has a core body 11 formed from a laminated core formed by laminating plates made of a magnetic material punched by press working or the like or a dust core formed by pressure-forming soft magnetic powder.

At an outer peripheral portion of the core body 11, eighteen teeth 12, which are substantially T-shaped, are provided in a radial fashion at equal intervals along the circumferential direction at the outer peripheral portion. Each tooth 12 is constituted by a winding drum portion 31 that extends in a radial direction and has a winding wire 14 wound therearound, and a peripheral wall portion 32 that is provided at the tip of the winding drum portion 31 and extends so as to be bilaterally symmetrical with respect to the winding drum portion 31. That is, the peripheral wall portion 32 provided at the tip of the tooth 12 constitutes the outer peripheral surface of the armature core 8, and the peripheral wall portion 32 faces a permanent magnet 7.

Eighteen groove-shaped slots 13 are formed between eighteen teeth 12 by providing the teeth 12 in a radial fashion at the outer peripheral portion of the core body 11. The slots 13 extend along the axial direction of the rotary shaft 3, and are formed at equal intervals along the circumferential direction.

The winding wire 14 coated with enamel is inserted through the slots 13, and the winding wire 14 is wound around the teeth 12. As a result, the armature coil 9 is formed on the armature core 8.

As the eighteen teeth 12 are formed on the core body 11 at equal intervals along the circumferential direction, the respective teeth 12 and the respective slots 13 are present point-symmetrically around the rotary shaft 3, respectively. On the other hand, the teeth 12 and the slots 13 are alternately present in a positional relationship with intervals of 90 degrees in the circumferential direction.

The permanent magnets 7 have four generated magnetic poles and two pole pairs, whereas eighteen teeth 12 and eighteen slots 13 are provided. That is, the number of the teeth 12 is set to 9 times the number of pole pairs.

Additionally, the respective teeth 12 and the respective slots 13 are point-symmetrical around the rotary shaft 3, and the teeth 12 and the slots 13 are present alternately at positions apart by an angle of 90 degrees from each other in the circumferential direction of the armature core 8. Thus, each tooth 12 that faces an N-pole permanent magnet 7 and each teeth 12 that faces an S-pole permanent magnet 7 shift from each other by a ½ pitch.

Eighteen segments 15 formed from a conductive material are attached onto the outer peripheral surface of the commutator 10. The segments 15 are made of a plate-like metal piece that is long in the axial direction, and are fixed onto the outer peripheral surface of the commutator 10 in parallel at equal intervals along the circumferential direction in a state where the segments are insulated from each other. The external diameter D1 of the commutator 10 is set within a range of 20 mm or more and 30 mm or less.

A riser 16 is molded at the end of each segment 15 near the armature core 8. The winding wire 14 that becomes a winding starting end and a winding finishing end of the armature coil 9 is connected to the riser 16 by fusing or the like. As a result, a segment 15 and the armature coil 9 corresponding to this segment are electrically connected to each other.

Figure 5:
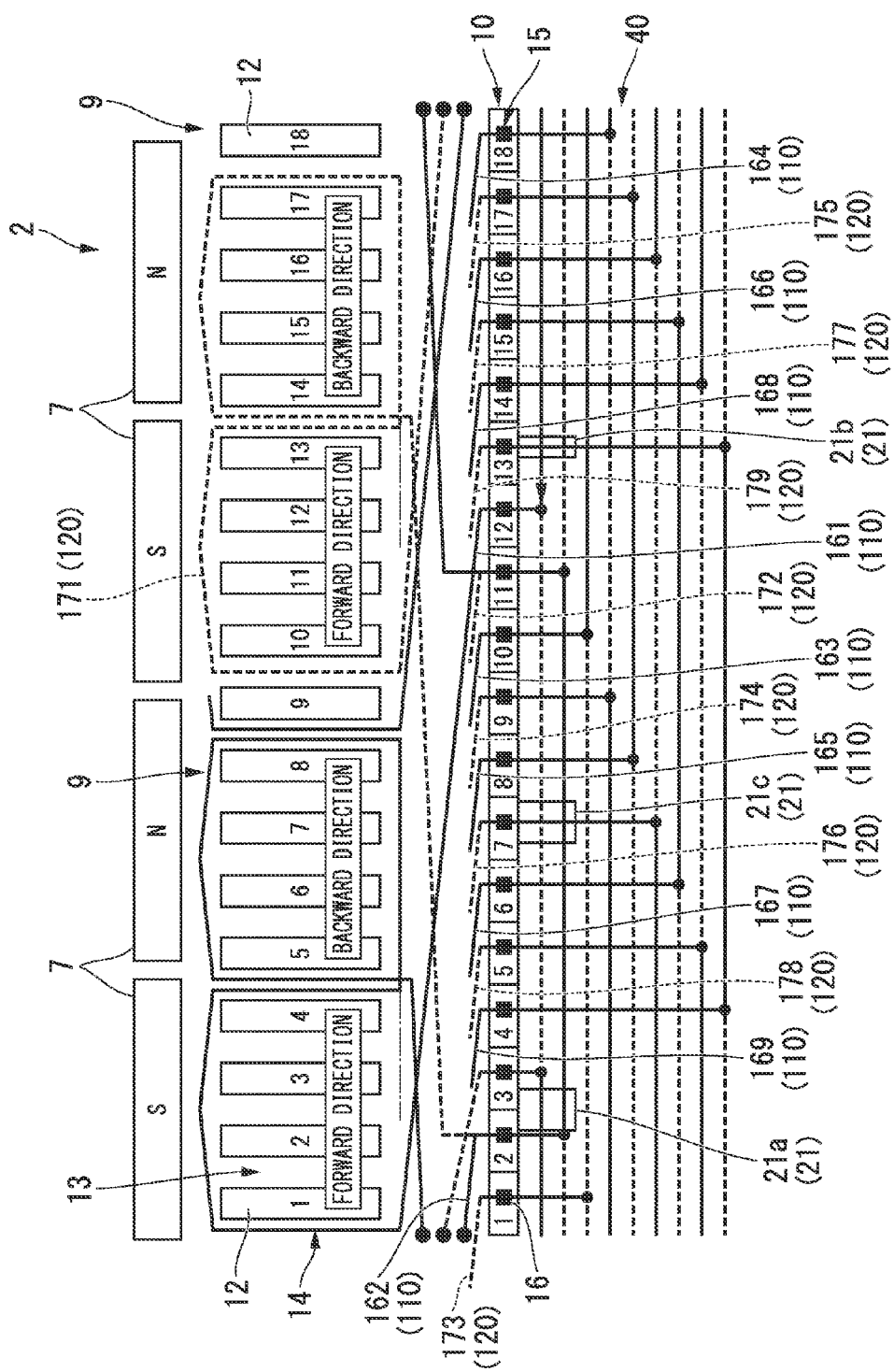
FIG. 5 is a development view of an armature according to the embodiment of the invention.

Additionally, a connecting wire 40 is connected to the risers 16 of two equipotential segments 15, that is, the risers 16 of two segments 15 (the risers 16 of every pair of segments 15 separated by nine positions in the present embodiment) that face each other around the rotary shaft 3 or the risers 16 of two segments 15 apart by an angle of 180 degrees from each other by fusing or the like (refer to FIG. 5). The connecting wire 40 is provided to short-circuit the equipotential segments 15 from each other, and is disposed between the commutator 10 and the armature core 8. A connecting wire portion is formed at the connecting wire 40 in a place where the connecting wires 40 and the commutator 10 are connected.

The commutator 10 configured in this way is arranged within the gear housing 23 of the reduction mechanism 4. The gear housing 23 is constituted by a housing body 42 that is formed in a substantially box shape, and a cover 43 that blocks an opening 42a of the housing body 42. A gear group 41 of the reduction mechanism 4 is housed in the housing body 42. Additionally, a brush housing portion 22 is formed at the housing body 42, and brushes 21 together with the commutator 10 of the electric motor 2 are accommodated in the housing body.

A peripheral wall 30 of the brush housing portion 22 is formed so as to have a substantially oval cross-section, and is constituted by planar walls 30a and circular-arc walls 30b.

A cover 33, which is formed in the shape of a tube having a substantially oval cross-section so as to correspond to the brush housing portion, is provided inside the brush housing portion 22. The cover 33 also has planar walls 33a and circular-arc walls 33b. Moreover, a holder stay 34 formed so as to correspond to the cover 33 is provided inside the cover 33. The holder stay 34 is fastened and fixed to a side wall 42b of the housing body 42 by bolts 35.

Brush holders 36 are provided in three places along the circumferential direction at the holder stay 34. The brushes 21 are biased by springs S, respectively, and accommodated within the brush holders 36, respectively. Since the brushes 21 are biased by the springs S, the tip portions of the brushes 21 come into sliding contact with the segments 15 of the commutator 10, and the electric current from an external power source (not shown) is supplied to the commutator 10 via the brushes 21.

The brushes 21 are constituted by a low-speed brush 21a and a high-speed brush 21b, which are connected to an anode of the external power source, and a common brush 21c that is used common to the low-speed brush 21a and the high-speed brush 21b and is connected to a cathode of the external power source. The low-speed brush 21a and the common brush 21c are arranged apart at an electrical angle of 180° from each other, that is, apart at a mechanical angle of 90 degrees in the circumferential direction of the commutator 10 from each other. Meanwhile, the high-speed brush 21b is arranged apart by an angle α in the circumferential direction from the low-speed brush 21a. In addition, although the present embodiment has been described that the common brush 21c is connected to the cathode of the external power source, and the low-speed brush 21a and the high-speed brush 21b are connected to the anode of the external power source, the anode and cathode may be connected in a reversed manner. Additionally, a description will be provided with a first brush, a second brush, and a third brush in the invention as the common brush 21c, the low-speed brush 21a, and the high-speed brush 21b, respectively.

In addition, the electric resistance value of the high-speed brush 21b is set to be two or more times higher than the electric resistance values of the low-speed brush 21a and the common brush 21c. Therefore, the current value of an electric current supplied from the high-speed brush 21b to the armature coil 9 is lowered. For example, when an electric current is supplied from the high-speed brush 21b to the armature coil 9 and the armature 6 of the electric motor 2 is rotating at high speed, the current value of a lock current supplied to the armature coil 9 is prevented from increasing in a case where the rotation of the armature 6 is stopped (locked) by an external load. Therefore, any unnecessary damage to an element for protecting an electric circuit, such as a fuse provided in a motor drive device, is prevented in advance.

In addition, as for two equipotential segments 15 connected by a connecting wire 40, if a brush 21 comes into sliding contact with one segment 15, an electric current is also supplied via the connecting wire 40 to the other segment 15 with which the brush 21 does not come into sliding contact. The high-speed brush 21b is arranged at a position that is advanced by an angle θ from the low-speed brush 21a. In addition, in the present embodiment, the angle θ is set to about 30 degrees.

By arranging the low-speed brush 21a, the high-speed brush 21b, and the common brush 21c in this way, the shapes of the cover 33 and the holder stay 34 become reasonable shapes. That is, the cover 33 is formed so as to have a substantially oval cross-section, and the low-speed brush 21a and the common brush 21c are arranged at connecting portions between the planar walls 33a and the circular-arc wall 33b. On the other hand, the high-speed brush 21b is arranged at the circular-arc wall 33b of the cover 33 opposite to places, where the low-speed brush 21a and the common brush 21c are arranged, around the rotary shaft 3. For this reason, the brush housing portion 22 is formed so as to have a substantially oval cross-section, and it is accordingly possible to form the brush housing portion 22 in a flattened shape.

Additionally, as shown in detail in FIG. 3, the brush widths W1 in the circumferential direction in which the low-speed brush 21a and the common brush 21c come into sliding contact with the commutator 10 are set to be almost the same. In contrast, the brush width W2 in the circumferential direction in which the high-speed brush 21b comes into sliding contact with the commutator 10 is set to be smaller than the brush width W1 of the low-speed brush 21a. Specifically, when the external diameter of the commutator 10 is set within a range of 20 mm or more and 30 mm or less, the brush widths W1 of the low-speed brush 21a and the common brush 21c are set within a range of 2.5 mm or more and 5 mm or less. On the other hand, the brush width W2 of the high-speed brush 21b is set to be in a range that is equal to and more than 1.5 mm and smaller than 2.5 mm.

By appropriately setting the brush widths W1 of the low-speed brush 21a and the common brush 21c and the brush width W2 of the high-speed brush 21b in this way, and by appropriately arranging the low-speed brush 21a, the common brush 21c, and the high-speed brush 21b with respect to each other, it is possible to avoid a situation where the low-speed brush 21a and the high-speed brush 21b simultaneously come into sliding contact with segments 15 having the same potential as each other. Hereinafter, a detailed description thereof will be provided.

Since two segments 15 apart by an angle of 180 degrees from each other are connected by a connecting wire 40 connected to the commutator 10, for example, a segment 15 that comes into sliding contact with the low-speed brush 21a, and a segment 15 apart by 180 degrees from this segment have the same potential. Accordingly, as the commutator 10, a virtual low-speed brush 21a is like being present even at a position shown by a two-dotted chain line in FIG. 3, and an electric current is supplied to the segment 15 that is apart by 180 degrees. In this case, the spacing between the virtual low-speed brush 21a and the high-speed brush 21b becomes almost the same as the width of the segments 15 as shown in FIG. 3. However, since the brush width W2 of the high-speed brush 21b is set to be smaller than the brush width W1 of the low-speed brush 21a, it is possible to avoid a situation where the low-speed brush 21a and the high-speed brush 21b simultaneously come into sliding contact with segments 15 having the same potential as each other.

This is also the same in the high-speed brush 21b and the common brush 21c. On the other hand, a high-speed brush 21b is considered to be present even at a position point-symmetrical around the rotary shaft 3 by a connecting wire 40 connected to the commutator 10. However, since the brush width W2 of the high-speed brush 21b is set to be smaller than the brush width W1 of the common brush 21c, a situation where a virtual high-speed brush 21b and the common brush 21c simultaneously come into sliding contact with the same segments 15 is avoided.

As shown in FIGS. 1 and 2, the gear group 41 housed in the housing body 42 of the gear housing 23 is constituted by a worm shaft 25 coupled to the rotary shaft 3 of the electric motor 2, a stepped gear 26 that meshes with the worm shaft 25, and a spur gear 27 that meshes with the stepped gear 26. The worm shaft 25 has one end coupled to the rotary shaft 3 and the other end rotatably journalled on the housing body 42. The stepped gear 26 is obtained by integrally forming a worm wheel 28 that meshes with the worm shaft 25, and a smaller-diameter gear 29 that is formed to have a smaller diameter than the worm wheel 28.

An idler shaft 61 is press-fitted into the radial center of the stepped gear 26. The idler shaft 61 protrudes to the side opposite to the smaller-diameter gear 29, and the protruding end 61a is rotatably journalled on the housing body 42. On the other hand, the tip of the smaller-diameter gear 29 that is present at the end of the idler shaft 61 opposite to the end 61a is rotatably journalled on the cover 43. In this way, the stepped gear 26 is brought into a state where both ends thereof are journalled to the housing body 42 and the cover 43.

The spur gear 27 meshes with the smaller-diameter gear 29 of the stepped gear 26. A boss portion 65 is formed at the radial center of the spur gear 27 so as to protrude toward the cover 43 side. The boss portion 65 is rotatably supported by the cover 43. Additionally, an output shaft 62 is press-fitted into the boss portion 65. The output shaft 62 protrudes from a bottom wall (an end portion) 42c of the housing body 42. A boss portion 63 is formed at the part of the bottom wall 42c of the housing body 42 corresponding to the output shaft 62 so as to protrude outward. The boss portion 63 is provided with a sliding bearing 64 for rotatably journalling the output shaft 62.

The portion of the output shaft 62 that protrudes from the housing body 42 is formed with a tapered portion 66 that is gradually tapered as it goes to the tip. The tapered portion 66 is formed with serrations 67. An external mechanism for driving a wiper or the like is coupled to the output shaft 62.

In addition, a connector 68 is provided at the side wall 42b of the housing body 42 so as to protrude along the axial direction of the rotary shaft 3. The connector 68 is provided to supply the electric power from the outside to the electric motor 2. A receiving port 69 of the connector 68 is provided with a connecting terminal 70, and the connecting terminal 70 is electrically connected to the brushes 21 (21a to 21c) of the electric motor 2. Thereby, the electric power from the outside is supplied to the commutator 10 via the brushes 21.

Moreover, bolt seats 71 for fastening and fixing the cover 43 are formed integrally with an opening edge of the housing body 42. Attachment seats 73, which has bolt-holes (not shown) through which bolts 72 can be inserted, are integrally formed at the parts of the cover 43 corresponding to the bolt seats 71 of the housing body 42. In the cover 43, as the bolts 72 are inserted through the attachment seats 73, and the bolts 72 are screwed into the bolt seats 71 of the housing body 42, the cover 43 is fastened and fixed to the housing body 42.

Additionally, the cover 43 is provided with a power distribution substrate 74 for electrically connecting the connecting terminal 70 of the connector 68 and the brushes 21 of the electric motor 2. The power distribution substrate 74 is formed with a wiring pattern (not shown) that has the role of a lead wire.

Next, the structure for winding the winding wire 14 around the armature core 8 of the armature 6 will be described with reference to FIG. 5.

FIG. 5 is a development view of the armature 6, and gaps between two adjacent teeth 12 correspond to the slots 13. In addition, in the following drawings, the respective segments 15 and the respective teeth 12 will be described with respective reference numerals given thereto.

As shown in detail in this drawing, two equipotential segments 15 are short-circuited by a connecting wire 40. That is, in the present embodiment, every pair of segments 15 (for example, a first segment 15 and a tenth segment 15) separated by nine positions are short-circuited by a connecting wire 40.

Here, the winding wire 14 is constituted by a first conductive wire 110 and a second conductive wire 120. In addition, in FIG. 5, the first conductive wire 110 is shown by solid lines, and the second conductive wire 120 is shown by broken lines.

A first coil 161 constituted by the first conductive wire 110 is connected to a segment 15 (No. 12) of the commutator 10, is wound so as to surround a first tooth, a second tooth, a third tooth, and a fourth tooth of the teeth 12, passes through a slot 13 between the fourth tooth and a fifth tooth of the teeth 12. Next, the first coil is wound in the backward direction so as to surround the fifth tooth, a sixth tooth, a seventh tooth, and an eighth tooth of the teeth 12, and is connected to a segment 15 (No. 11) of the commutator 10.

A first coil 171 constituted by the second conductive wire 120 is connected to a segment 15 (No. 3) of the commutator 10, is wound so as to surround a tenth tooth, an eleventh tooth, a twelfth tooth, and a thirteenth tooth of the teeth 12, passes through a slot 13 between the thirteenth tooth and a fourteenth tooth of the teeth 12. Next, the second coil is wound in the backward direction so as to surround the fourteenth tooth, a fifteenth tooth, a sixteenth tooth, and a seventeenth tooth of the teeth 12, and is connected to a segment 15 (No. 2) of the commutator 10.

The first conductive wire 110 connected to the segment 15 (No. 11) of the commutator 10 becomes a connecting wire 40, and is connected from the segment (No. 11) of the commutator 10 to the segment (No. 2). The first conductive wire 110 becomes a coil 162 from the segment (No. 2), is wound so as to surround a ninth tooth, the tenth tooth, the eleventh tooth, and the twelfth tooth of the teeth 12, passes through a slot 13 between the twelfth tooth and the thirteenth tooth of the teeth 12. Next, the first conductive wire is wound in the backward direction so as to surround the thirteenth tooth, the fourteenth tooth, the fifteenth tooth, and the sixteenth tooth of the teeth 12, and is connected to a segment (No. 1) of the commutator 10.

Similarly, a coil 163, a coil 164, a coil 165, a coil 166, a coil 167, a coil 168, and a coil 169 are wound. The coil 163 is connected to a segment (No. 10) and a segment (No. 9), the coil 164 is connected to a segment (No. 18) and a segment (No. 17), the coil 165 is connected to a segment (No. 8) and a segment (No. 7), the coil 166 is connected to a segment (No. 16) and a segment (No. 15), the coil 167 is connected to a segment (No. 6) and a segment (No. 5), the coil 168 is connected to a segment (No. 14) and a segment (No. 13), and the coil 169 is connected to a segment (No. 4) and a segment (No. 3).

The connecting wires 40 are also formed by the first conductive wire 110 between the segment (No. 9) and the segment (No. 18), between the segment (No. 7) and the segment (No. 16), between the segment (No. 15) and the segment (No. 6), and between the segment (No. 13) and the segment (No. 4).

The second conductive wire 120 connected to the segment (No. 2) of the commutator 10 becomes a connecting wire 40, and is connected from the segment (No. 2) of the commutator 10 to the segment (No. 11). The second conductive wire 120 becomes a coil 172 from the segment (No. 11), is wound so as to surround the eighteenth tooth, the first tooth, the second tooth, and the third tooth of the teeth 12, passes through a slot 13 between the third tooth and the fourth tooth of the teeth 12. Next, the second conductive wire is wound in the backward direction so as to surround the fourth tooth, the fifth tooth, the sixth tooth, and the seventh tooth of the teeth 12, is connected to the segment (No. 10) of the commutator 10.

Similarly, a coil 173, a coil 174, a coil 175, a coil 176, a coil 177, a coil 178, and a coil 179 are wound. The coil 173 is connected to the segment (No. 1) and the segment (No. 18), the coil 174 is connected to the segment (No. 9) and the segment (No. 8), the coil 175 is connected to the segment (No. 17) and the segment (No. 16), the coil 176 is connected to the segment (No. 7) and the segment (No. 6), the coil 177 is connected to the segment (No. 15) and the segment (No. 14), the coil 178 is connected to the segment (No. 5) and the segment (No. 4), and the coil 179 is connected to the segment (No. 13) and the segment (No. 12).

The connecting wires 40 are also formed by the first conductive wire 110 between the segment (No. 18) and the segments (No. 9), between the segment (No. 16) and the segment (No. 7), between the segment (No. 6) and segment (No. 15), and between the segment (No. 4) and the segment (No. 13).

As shown in FIG. 5, when the low-speed brush 21*a* is connected to the segment (No. 2) and the segment (No. 3), the high-speed brush 21*b* is not connected to the segment (No. 11) and the segment (No. 12) that are connected to the segment (No. 2) and the segment (No. 3) by the connecting wire 40, and the high-speed brush 21*b* is connected to the segment (No. 13) adjacent to the segment (No. 12). The first to ninth winding wires 161 to 169 formed by the first conductive wire 110 and the first to ninth winding wires 171 to 179 formed by the second conductive wire 120 are arranged at positions that are respectively point-symmetrical around the rotary shaft 3. The first conductive wire 110 includes a first semi-coil wound around four teeth and a second semi-coil wound around four teeth, and the first semi-coil and the second semi-coil are wound in the opposite direction. This is also the same in the second conductive wire 120.

That is, the first winding wire 161 formed by the first conductive wire 110 and the other first winding wire 171 formed by the second conductive wire 120 are present at positions that face each other around the rotary shaft 3, and a first winding wire pair is formed by the winding wire 161 and the winding wire 171. Similarly, a second winding wire pair (162, 172), a third winding wire pair (163, 173), a fourth winding wire pair (164, 174), a fifth winding wire pair (165, 175), a sixth winding wire pair (166, 176), a seventh winding wire pair (167, 177), an eighth winding wire pair (168, 178), and a ninth winding wire pair (169, 179) are formed by the second to ninth winding wires 162 to 169 and the other second to ninth winding wires 172 to 179, respectively.

The first to ninth winding wires 161 to 169 are connected in a series via nine connecting wires 40, respectively. On the other hand, the other first to ninth winding wires 171 to 179 are connected in a series via nine connecting wires 40, respectively. A winding starting end and a winding finishing end of each of the winding wires 161 to 179 are connected between adjacent segments 15 and 15. The winding wires 161 to 169 and the winding wires 171 to 179 are wound using, for example, a double flyer type winding machine or the like.

Next, the operation of the reduction motor 1 will be described.

First, during low rotational driving, electric power is supplied to the electric motor 2 of the reduction motor 1 through the common brush 21*c* and the low-speed brush 21*a*. At this time, a magnetic field is generated by an electric current flowing through the armature coil 9 wound around the armature core 8, and magnetic attractive or repulsive forces are generated between this magnetic field and magnetic fields generated by the permanent magnets 7 provided at the yoke 5 to drive the rotary shaft 3 of the armature 6. On the other hand, during high rotational driving, electric power is supplied to the high-speed brush 21b, and the electric motor 2 operates at a higher rotational speed than that during the low rotational driving.

When the rotary shaft 3 rotates, the rotative force of the rotary shaft 3 is transmitted to the output shaft 62 via the reduction mechanism 4. Since an external mechanism for driving a wiper or the like is coupled to the output shaft 62, the external mechanism operates at low speed or operates at high speed as the output shaft 62 rotates.

Here, the respective teeth 12 and the respective slots 13 of the electric motor 2 are arranged point-symmetrically around the rotary shaft 3. Since the teeth 12 are eighteen, a slot 13 is present at a position apart by an angle of 90 degrees from one tooth 12 and a tooth 12 is present at a position apart by an angle of 90 degrees from one slot 13. Since four permanent magnets 7 are arranged at equal intervals, teeth 12 that face two ends of each permanent magnet 7a are shifted from each other by ½ pitch.

For this reason, cogging torques generated in the armature 6 at the ends of each magnet 7 are generated so as to shift from each other by ½ of the pitch of the interval between the teeth 12. That is, the same cogging torque is not generated simultaneously at both ends of the magnet 7. As a result, the cogging torque is reduced. Hence, the cogging torque of the whole electric motor 2 decreases.

During the low rotational driving, electric power is supplied to the armature 6 through the common brush 21c and the low-speed brush 21a, electric power is not supplied to the high-speed brush 21b. For this reason, when the high-speed brush 21b simultaneously contacts two adjacent segments 15 and 15, the segments 15 and 15 are short-circuited by the high-speed brush 21b. Electric currents supplied through the common brush 21c and the low-speed brush 21a do not flow to the winding wire 14 connected to the two short-circuited segments 15 and 15.

At this time, since magnetic flux generated by the magnet 7 passes through the winding wire 14 that becomes a closed loop by the high-speed brush 21b, an induced voltage (counter-electromotive force) is generated in the winding wire 14 due to a change in this magnetic flux, and electric current flows to the winding wire 14. The direction of this electric current is opposite to the direction of the electric currents supplied from the common brush 21c and the low-speed brush 21a, and if a large electric current continues flowing, a torque ripple increases.

However, in the present embodiment, the brush widths W1 of the low-speed brush 21a and the common brush 21c in the circumferential direction are set to be almost the same as each other, and the circumferential brush width W2 of the high-speed brush 21b is set to be smaller than the brush width W1 of the low-speed brush 21a (refer to FIG. 3). For this reason, the time for which the high-speed brush 21b contacts two adjacent segments 15 and 15 becomes short. Additionally, since the resistance value of the high-speed brush 21b increases, an electric current that flows into the winding wire 14 in which a closed loop is formed by the high-speed brush 21b decreases.

On the other hand, since electric power is supplied to the armature 6 through the common brush 21c and the high-speed brush 21b during the high rotational driving, electric power is not supplied to the low-speed brush 21a. In a case where the low-speed brush 21a contacts two adjacent segments 15 and 15, the winding wire 14 connected to the two segments 15 and 15 are also short-circuited. However, an induced voltage (counter-electromotive force) is scarcely generated in the short-circuited winding wire 14. This is because the low-speed brush 21a is arranged at a position where an induced voltage (counter-electromotive force) is scarcely generated in the winding wire 14, and contacts the two adjacent segments 15 and 15 at that position.

Therefore, according to the above-described embodiment, there is provided the armature 6 in which the number of pole pairs is two, that is, the number of magnetic poles is four, and the numbers of teeth 12 are 7 times (fourteen), 9 times (eighteen), and 11 times (twenty two) the number of pole pairs. Thus, the cogging torque can be reduced even in the variable-speed electric motor 2. For this reason, the vibration and noise of the electric motor 2 (reduction motor 1) are reduced. Particularly, an increase in the torque ripple resulting from the high-speed brush 21b can be reduced during the low rotational driving with high use frequency compared to the high rotational driving. For this reason, it is possible to further reduce the vibration and noise of the electric motor 2 during the low rotational driving.

Additionally, by setting the circumferential brush width W2 of the high-speed brush 21b to be smaller than the circumferential brush widths W1 of the low-speed brush 21a and the common brush 21c, a situation where the low-speed brush 21a and the high-speed brush 21b simultaneously come into sliding contact with the same segments 15 is avoided.

In addition, it should be understood that the invention is not limited to the above-described embodiment, and various modifications may be made to the above-described embodiment without departing from the spirit of the invention.

Additionally, a case where the armature core 8 of the electric motor 2 is provided with eighteen teeth 12, and the number of the teeth 12 is set to 9 times the number of pole pairs has been described in the above-described embodiment. However, the number of teeth 12 is not limited to this and the number of teeth 12 may be set to any of 7 times, 9 times, and 11 times the number of pole pairs.

INDUSTRIAL APPLICABILITY

As described above, according to the invention, it is possible to provide a variable-speed electric motor and a reduction motor that can reduce vibration and noise while achieving miniaturization and high performance.

REFERENCE SIGNS LIST

1: REDUCTION MOTOR
2: ELECTRIC MOTOR
3: ROTARY SHAFT
4: REDUCTION MECHANISM
5: YOKE
6: ARMATURE
7: PERMANENT MAGNET (MAGNETIC POLE)
8: ARMATURE CORE
9: ARMATURE COIL (COIL)
10: COMMUTATOR
12: TEETH
13: SLOT
14: WINDING WIRE (COIL)
15: SEGMENT
21: BRUSH
21a: LOW-SPEED BRUSH
21b: HIGH-SPEED BRUSH
21c: COMMON BRUSH
25: WORM SHAFT
28: WORM WHEEL
40: CONNECTING WIRE (SHORT-CIRCUITING MEMBER)

D1: EXTERNAL DIAMETER
W1, W2: BRUSH WIDTH

The invention claimed is:

1. An electric motor comprising:
a yoke formed in a bottomed cylindrical shape;
permanent magnets being arranged on an inner peripheral surface of the yoke and generating four magnetic poles formed of alternately arranged magnetic poles;
an armature including a rotary shaft journalled on the yoke, an armature core formed with a plurality of teeth and fixed onto the rotary shaft, an armature coil wound around the teeth of the armature core, a commutator having a plurality of segments formed from a conductive material and fixed onto the rotary shaft, and a connecting wire connecting two segments arranged to face each other back to back around the rotary shaft among a plurality of segments of the commutator, the armature being surrounded by the permanent magnets and accommodated within the yoke; and
a first brush, a second brush, and a third brush coming into sliding contact with the segments of the commutator of the armature,
wherein the number of the teeth of the armature core and the number of the segments of the commutator are the same number, and are any of fourteen, eighteen, and twenty two,
wherein the teeth of the armature core are formed point-symmetrically,
wherein the first brush and the second brush are arranged apart by an angle of substantially 90 degrees from each other,
wherein the third brush is arranged apart by an angle exceeding 90 degrees from the first brush and second brush,
wherein the first brush is connected to a common potential,
wherein an electric current for rotating the armature at low speed is selectively supplied to the second brush,
wherein an electric current for rotating the armature at high speed is selectively supplied to the third brush,
wherein a width of the third brush is made smaller than a width of the second brush, and
wherein the third brush is arranged at a position where the third brush does not come into sliding contact with an equipotential segment connected by the connecting wire to a segment of the commutator coming into sliding contact with the second brush.

2. The electric motor according to claim 1,
wherein an electric resistance value of the third brush is a value of two times or more an electric resistance value of the second brush.

3. The electric motor according to claim 1,
wherein a width of the first brush and the width of the second brush are made substantially the same, and an electric resistance value of the first brush and an electric resistance value of the second brush are substantially the same.

4. The electric motor according to claim 1,
wherein widths of the first brush and the second brush in the circumferential direction are set within a range of 2.5 mm or more and 5 mm or less, and the circumferential width of the third brush is set to a range that is equal to and more than 1.5 mm and smaller than 2.5 mm.

5. The electric motor according to claim 1,
wherein the third brush is arranged apart from the first brush by an angle $\theta$ that exceeds 90 degrees where the third brush does not come into sliding contact with an equipotential segment connected by the connecting wire to a segment of the commutator coming into sliding contact with the second brush.

6. The electric motor according to claim 1,
wherein the armature coil of the armature includes a plurality of first winding wires formed by a first conductive wire, and a plurality of second winding wires formed by a second conductive wire,
wherein the first winding wires and the second winding wires are arranged point-symmetrically,
wherein the connecting wire includes a plurality of first connecting wire portions formed by the first conductive wire and a plurality of second connecting wire portions formed by the second conductive wire,
wherein the plurality of first connecting wire portions connect the plurality of first winding wires in series, and
wherein the plurality of second connecting wire portions connect the plurality of second winding wires in series.

* * * * *